United States Patent
Germaine et al.

(10) Patent No.: US 11,667,250 B2
(45) Date of Patent: Jun. 6, 2023

(54) HUMAN MACHINE INTERFACE FOR COMMERCIAL VEHICLE CAMERA SYSTEMS

(71) Applicant: Stoneridge Electronics AB, Solna (SE)

(72) Inventors: John S. Germaine, Northville, MI (US); Susan Kolinski, Walled Lake, MI (US); Dominik Marx, Novi, MI (US); John Couperthwaite, Ypsilanti, MI (US)

(73) Assignee: Stoneridge Electronics AB, Solna (SE)

( * ) Notice: Subject to any disclaimer, the term of this patent is extended or adjusted under 35 U.S.C. 154(b) by 0 days.

(21) Appl. No.: 17/342,745

(22) Filed: Jun. 9, 2021

(65) Prior Publication Data

US 2021/0394686 A1 Dec. 23, 2021

Related U.S. Application Data

(60) Provisional application No. 63/041,176, filed on Jun. 19, 2020.

(51) Int. Cl.
*B60R 11/04* (2006.01)
*B60R 1/12* (2006.01)
(Continued)

(52) U.S. Cl.
CPC ............... *B60R 11/04* (2013.01); *B60R 1/12* (2013.01); *G01S 13/08* (2013.01); *G01S 13/867* (2013.01);
(Continued)

(58) Field of Classification Search
CPC ... B60R 11/04; B60R 1/12; B60R 2001/1253; B60R 2300/105; B60R 2300/301;
(Continued)

(56) References Cited

U.S. PATENT DOCUMENTS

| 5,247,442 A | 9/1993 | Kendall |
| 10,486,596 B2 | 11/2019 | Rathi et al. |

(Continued)

FOREIGN PATENT DOCUMENTS

| DE | 102006035021 | 1/2008 | |
| EP | 3138736 A1 * | 3/2017 | ............... B60R 1/00 |

(Continued)

OTHER PUBLICATIONS

International Search Report and Written Opinion for Application No. PCT/US2021/036528 completed on Aug. 31, 2021.
(Continued)

*Primary Examiner* — Sath V Perungavoor
*Assistant Examiner* — Tyler B Edwards
(74) *Attorney, Agent, or Firm* — Carlson, Gaskey & Olds, P.C.

(57) ABSTRACT

A method for operating a vehicle camera system including receiving a first image from at least one video camera, identifying a first object in the first image, determining a distance between a vehicle component and the identified object, modifying the first image by incorporating a human machine interface (HMI) within the first image, wherein the human machine interface includes a display configured to communicate the distance between the object and the vehicle component, and displaying the modified image to a vehicle operator.

21 Claims, 5 Drawing Sheets

(51) Int. Cl.
*G01S 13/08* (2006.01)
*G01S 13/86* (2006.01)

(52) U.S. Cl.
CPC . *B60R 2001/1253* (2013.01); *B60R 2300/105* (2013.01); *B60R 2300/301* (2013.01); *B60R 2300/303* (2013.01); *B60R 2300/305* (2013.01); *B60R 2300/8046* (2013.01)

(58) Field of Classification Search
CPC ........ B60R 2300/303; B60R 2300/305; B60R 2300/8049; B60R 1/00; B60R 2300/304; G01S 13/08; G01S 13/867; B60K 2370/1523; B60K 2370/171; B60K 2370/176; B60K 2370/179; B60K 2370/48; B60K 35/00
See application file for complete search history.

(56) References Cited

U.S. PATENT DOCUMENTS

2016/0052548 A1 2/2016 Singh et al.
2020/0070725 A1* 3/2020 Ding ..................... G06V 20/58

FOREIGN PATENT DOCUMENTS

| EP | 3138736 B1 | 7/2018 |
| EP | 3785996 A1 | 3/2021 |
| TW | M593949 U | 4/2020 |

OTHER PUBLICATIONS

International Preliminary Report on Patentability for International Patent Application No. PCT/US2021/036528 dated Dec. 13, 2022.

\* cited by examiner

HUMAN MACHINE INTERFACE FOR COMMERCIAL VEHICLE CAMERA SYSTEMS

CROSS-REFERENCE TO RELATED APPLICATION

This application claims priority to U.S. Patent Application No. 63/041,176 filed on Jun. 19, 2020.

TECHNICAL FIELD

The present disclosure relates generally to commercial vehicle systems, and more specifically to a human machine interface for displaying distance information.

BACKGROUND

Commercial vehicles, such as tractor trailers, include driver assistance systems that assist drivers in maneuvering their vehicles into docking areas, reversing maneuvers, passing objects, and other similar vehicle operations. Existing vehicle systems incorporate proximity sensors, and other similar systems to provide alerts when the commercial vehicle is within a threshold distance of an object. By way of example, the alert can include a repeating audible beep or flashing light when the object is within the threshold distance.

Proximity based alert systems are limited in the type of alert they can provide, and do not effectively convey more detailed information than the binary detection of whether the object is within the threshold distance.

SUMMARY OF THE INVENTION

An exemplary method for operating a vehicle camera system includes generating a first image using at least one video camera, identifying a first object in the first image, determining a distance between a vehicle component and the identified object, modifying the first image by incorporating a human machine interface (HMI) within the first image, wherein the human machine interface includes a display configured to communicate the distance between the object and the vehicle component, and displaying the modified image to a vehicle operator.

In another example of the above described method for operating a vehicle camera system determining the distance between the object and the vehicle component is at least partially based on an image analysis of the first image.

In another example of any of the above described methods for operating a vehicle camera system determining the distance between the object and the vehicle component is at least partially based on a physical sensor reading.

In another example of any of the above described methods for operating a vehicle camera system the physical sensor reading includes at least one of a radar sensor reading, a LIDAR sensor reading, an infrared sensor reading, a time of flight sensor, and an ultrasonic sensor reading.

In another example of any of the above described methods for operating a vehicle camera system the physical sensor reading includes a radar sensor reading and an ultrasonic reading.

In another example of any of the above described methods for operating a vehicle camera system the steps of modifying the first image by incorporating the human machine interface (HMI) within the first image and displaying the modified mirror-replacement image to the vehicle operator are performed in response to the determined distance being below a predefined threshold distance.

In another example of any of the above described methods for operating a vehicle camera system the threshold distance is approximately 30 meters.

In another example of any of the above described methods for operating a vehicle camera system the threshold distance is an activation distance for at least one automated driver assistance feature.

In another example of any of the above described methods for operating a vehicle camera system the vehicle component is an ego part.

In another example of any of the above described methods for operating a vehicle camera system the ego part is a trailer.

In another example of any of the above described methods for operating a vehicle camera system the human machine interface comprises at least one of a numerical indicator, a multi-color overlay, and a bar-graph.

In another example of any of the above described methods for operating a vehicle camera system the human machine interface comprises a combination of at least two of the numerical indicator, the multi-color overlay, and the bar-graph.

In another example of any of the above described methods for operating a vehicle camera system the human machine interface comprises an object indicator identifying the detected object in the displayed image.

In another example of any of the above described methods for operating a vehicle camera system generating the first image comprises generating a mirror replacement image by combining a plurality of images originating from distinct vehicle cameras.

In another example of any of the above described methods for operating a vehicle camera system further comprising overlaying at least one distance line on top of the first image, wherein the at least one distance line is calibrated at a predefined distance using the distance displayed in the human machine interface.

In one exemplary embodiment a vehicle system includes at least one exterior facing camera, a controller including an input connected to an output of the at least one exterior facing camera, an interior facing display connected to the controller, wherein the controller includes a memory storing instructions configured to cause the controller to identify a first object in a first image received by the controller, determine a distance between a vehicle component and the identified object, modify the first image by incorporating a human machine interface (HMI) within the first image, and output the modified image to the display, and wherein the human machine interface includes a display configured to communicate the distance between the object and the vehicle component.

In another example of the above described vehicle system the controller is connected to a proximity sensor, the proximity sensor being configured to determine a distance between the proximity sensor, and a detected object.

In another example of any of the above described vehicle systems the proximity sensor includes at least one of at least one of a radar sensor, a LIDAR sensor, an infrared sensor, a time of flight sensor and an ultrasonic sensor.

In another example of any of the above described vehicle systems the proximity sensor includes a radar sensor and an ultrasonic sensor.

In another example of any of the above described vehicle systems the controller further includes an at least partially image based object detection module.

In another example of any of the above described vehicle systems the at least partially image based object detection module includes supplemental sensor based object detection.

DETAILED DESCRIPTION

Figure 1:
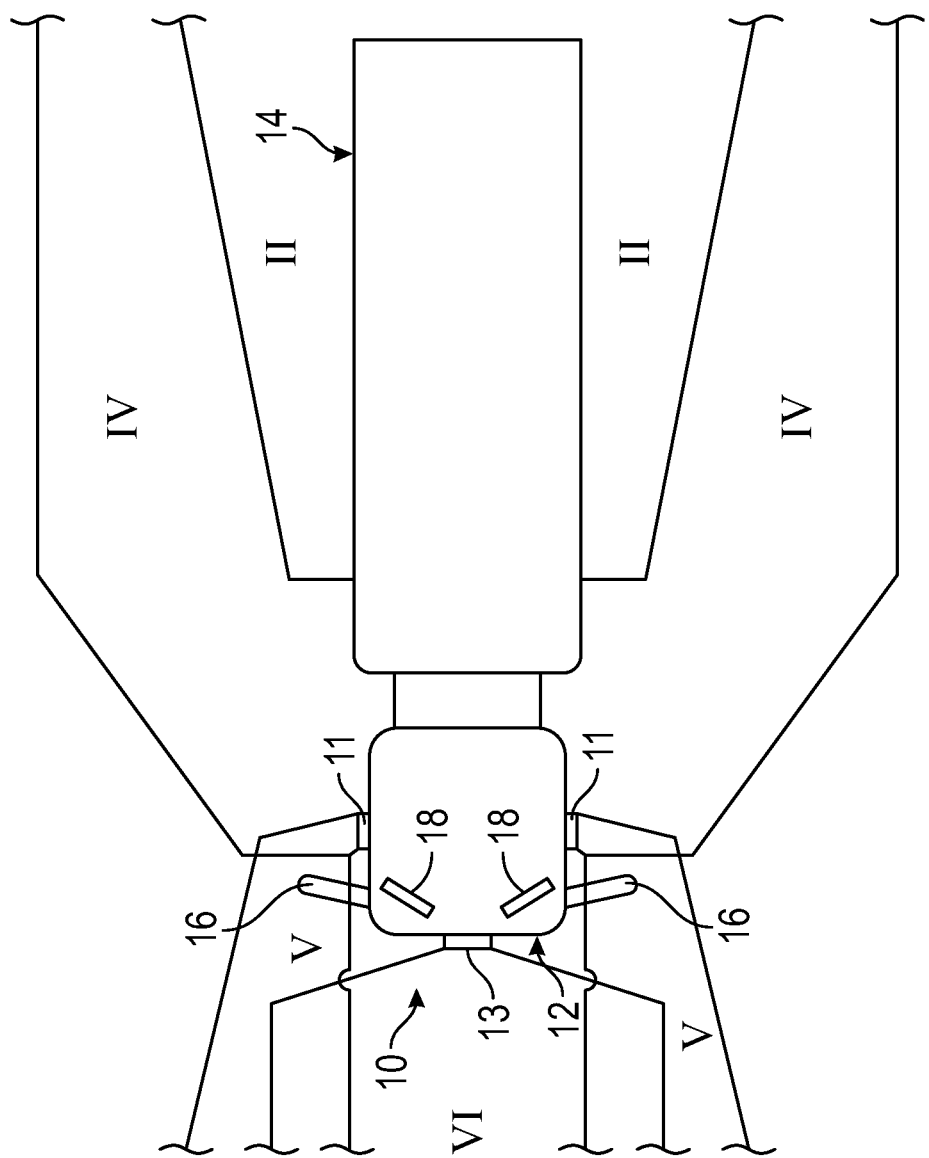
FIG. 1 illustrates a high level schematic view of an exemplary commercial vehicle.

A schematic view of a commercial truck 10 is illustrated in FIG. 1. The truck 10 includes a vehicle cab 12 pulling a trailer 14. The exemplary trailer 14 is an ego part capable of moving independently relative to the cab 12. Driver and passenger side camera housings 16 are mounted to the vehicle cab 12. In some examples, the camera housings 16 may include conventional mirrors integrated with them as well. First and second displays 18 are arranged on each of the driver and passenger sides within the vehicle cab 12 to display class II and class IV views on each side of the vehicle 10. Fewer or more displays may be used than shown, including additional class displays, and the displays may be located differently than illustrated. In alternative examples, stitching can be utilized in combining images to form a surround view image using additional cameras 11 and camera 13. The illustrated camera positions are exemplary only, and practical implementations can include multiple additional cameras of any particular view type as may be needed by a given system.

Figure 2:
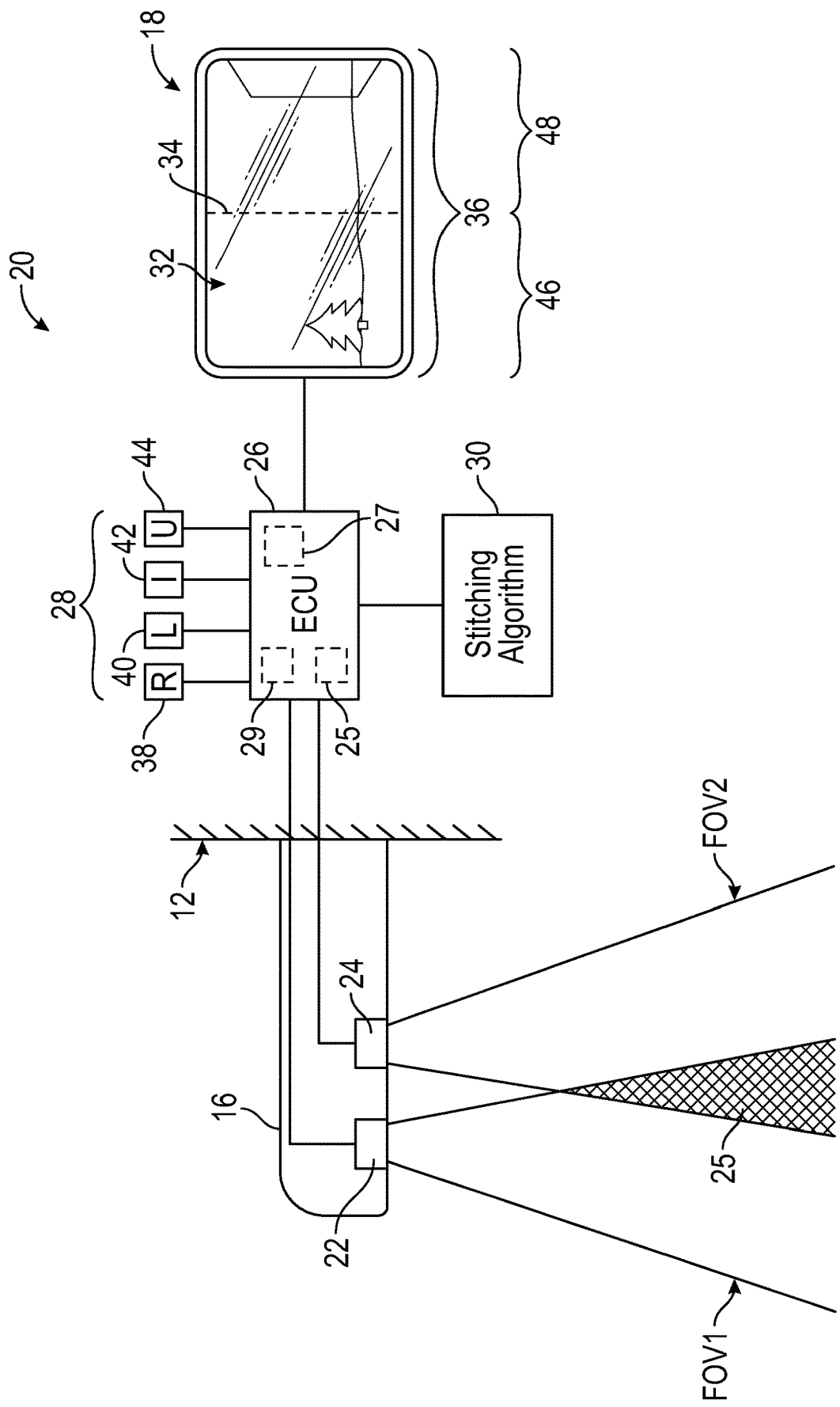
FIG. 2 schematically illustrates a camera replacement and/or supplement system for a commercial vehicle.

One example camera mirror system 20 is shown in a highly schematic fashion in FIG. 2. In one example, rearward facing first and second cameras 22, 24 are arranged within the camera housing 16. The first and second cameras 22, 24 provide first and second fields of view 22 FOV1, FOV2 that correspond to the class IV and class II views, for example. The first and second fields of view FOV1, FOV2 overlap with one another to provide an overlap area 25. It should be understood, however, that the cameras may be placed differently than illustrated and the fields of view provided may relate to other classes or other views entirely.

An ECU, or controller, 26 is in communication with the first and second cameras 22, 24. Various sensors 28, such as a radar sensor 38, a LIDAR sensor 40, an infrared sensor 42, a time of flight sensor, and/or an ultrasonic sensor 44 may be in communication with the controller 26. The sensors 28 and/or first and second cameras 22, 24 are used to detect objects within the images captured by the first and second cameras 22, 24. Alternatively, or in addition to the sensors 28, an image based object detection algorithm 29 can be included in the controller 26. The image based object detection algorithm 29 can be a rules based detection algorithm or a neural network based algorithm and analyzes images provided from the cameras 22, 24 to identify the presence of one or more objects within the image(s).

Any number of suitable object detection schemes may be used, such as those that rely on neural networks and 3D geometry models to determine positions of objects in space, such as detection from ego-motion. In the case of object detection using a neural network, the first and second cameras 22, 24 provide at least one of the sensors used to detect the object. In alternative examples, any object detection system can be used to detect objects within an image plane, including image based detection such as neural networks analysis, as well as detecting images in 3D space using 3D space detection systems such as radar, LIDAR, sensors and the like.

The controller 26 outputs a video signal to a display 18. The display 18 is positioned within the vehicle cab in a position visible to the vehicle operator. In examples with two or more cameras, such as the illustrated example of FIG. 2, the video signal is a combination of the images from the first and second cameras 22, 24 and a stitching algorithm 30 is used to combine the images. In the example, a screen 32 of the display 18 provides a complete view 36 consisting of at least first and second adjusted fields of view 46, 48 from the first and second cameras 22, 24 that are joined at a stitching interface 34 (alternatively referred to as stitching). The stitching algorithm 30 can utilize any known stitching system to create the single image visible to the vehicle operator.

Figure 3:
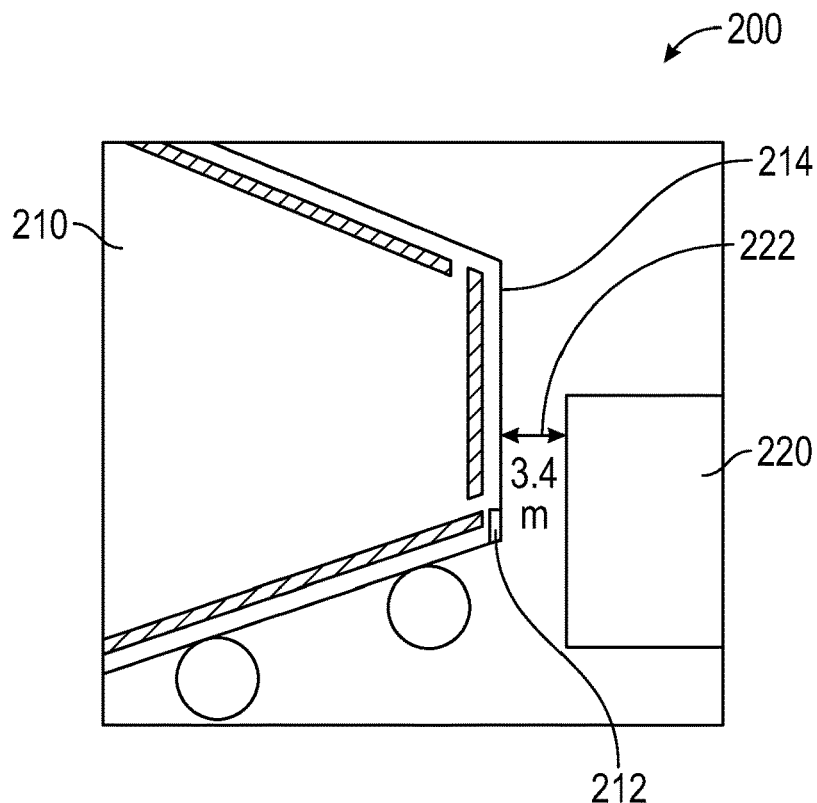
FIG. 3 schematically illustrates an exemplary display for the commercial vehicle of FIGS. 1 and 2.

With continued reference to FIGS. 1 and 2, FIG. 3 illustrates a mirror-replacement display 200, such as could be used in the display 18 of FIGS. 1 and 2. The display 200 shows an image of a side view of a commercial vehicle ego part 210. While illustrated as a single image in the example of FIG. 2, it is appreciated that alternative mirror-replacement images can be comprised of stitched images such as those described above with regards to FIG. 2. The exemplary ego part 210 is a commercial shipping trailer, although it is understood that the ego part 210 in a practical implementation can include any attached component capable of moving independently of the vehicle. Also visible in the image 200 is an object 220. The object is a distance 222 away from the vehicle component 210.

The controller 26, illustrated in FIG. 2, detects the object 220 and determines the distance 222 between the ego part 210 and the detected object 220. In some examples, the distance is determined exclusively using image-based analysis via the controller 26. In alternative examples a sensor 212, such as a radar sensor, a LIDAR sensor, an infrared sensor, or an ultrasonic sensor, is disposed on the ego part 210 or the main vehicle. In such examples, the controller 26 receives the sensor output and determines the distance 222 to the object 220 using any known distance determination corresponding to the sensor type. In yet further examples the distance can be determined via a combination of image based analysis and sensor based analysis according to known systems for determining the distance. Also incorporated into the controller 26 is one or more driver assistance system 27. By way of example, the driver assistance system 27 can include a docking assistance system, a trailer reverse assistance, or any other driver assistance system.

To further assist the vehicle operator in preforming maneuvers, the controller 26 includes a human machine interface (HMI) module 25 configured to modify the image displayed to the vehicle operator to include a human machine interface identifying the distance 220. The example display 200 of FIG. 3 implements the human machine interface by superimposing a line between the object 220 and the vehicle component 210. Immediately adjacent to the line is a numerical indicator defining the determined distance between the object 220 and the vehicle component 210. The distance 222 arrow can further include color coding indicative of how close the vehicle component 210 and the object 220 are with the arrow shifting from green indicating a safe distance to red indicating a dangerous distance.

Figure 4:
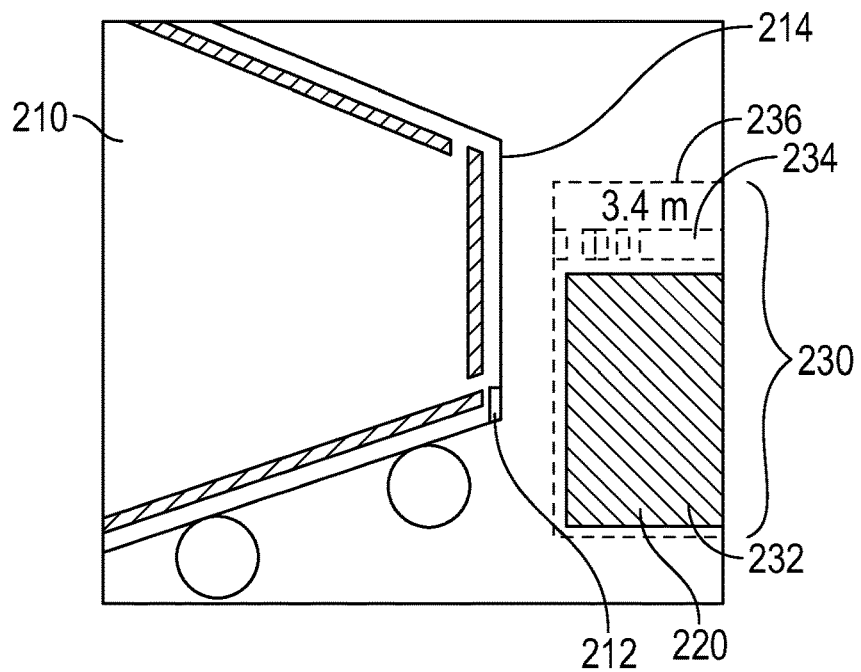
FIG. 4 schematically illustrates the exemplary display of FIG. 3 including an alternative human machine interface overlay.
Figure 5:
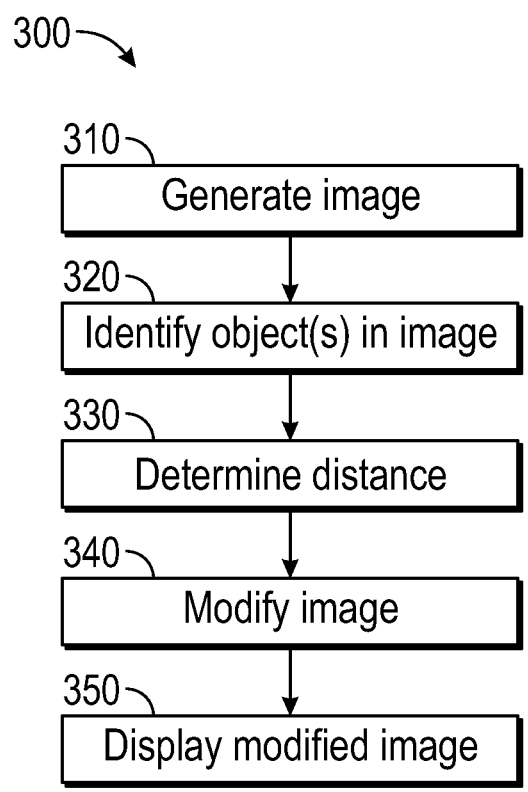
FIG. 5 illustrates a method for operating the camera replacement and/or supplement system to generate an image including a human machine interface.

With continued reference to FIG. 3, FIG. 4 illustrates the display 200 including an alternate human machine interface 230. The alternative human machine interface 230 utilizes a color gradient overlaid on top of the object 220, a bar graph 234 indicating proximity to the object, and a numerical indicator 236 indicating the distance. Each of the examples provides an indication of the approximate distance between the object 220 and the vehicle component 210. As used herein "approximate" refers to the accuracy of the distance determination 220.

Figure 6:
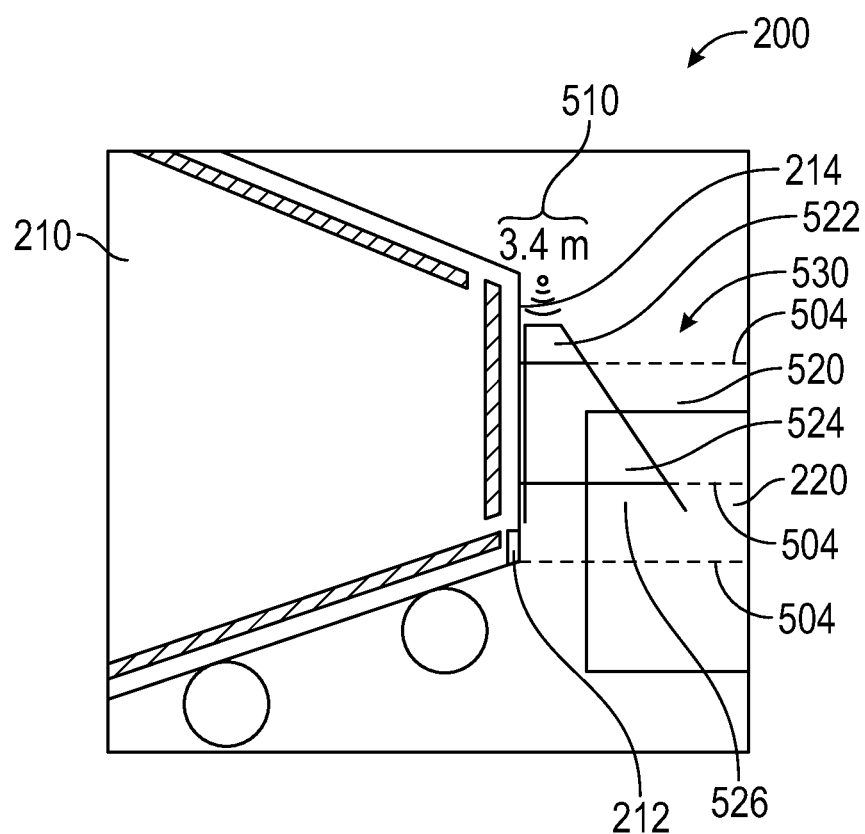
FIG. 6 schematically illustrates the exemplary display of FIG. 3 including an alternative human machine interface overlay.

With continued reference to FIGS. 3 and 4, FIG. 6 illustrates another alternate human machine interface 530 (HMI 530). The human machine interface 530 includes a numerical distance indicator 510 indicating the numerical distance between the rear of the trailer 210 and the detected object 220 and the units of the numerical distance. Positioned below the numerical indicator 510 is a range indicator 520 that expands downwards and outwards, with the farther downwards and outwards that the range indicator 510 has expanded corresponding to the closer the vehicle 210 is to the detected object 220. The range indicator 510 is separated into multiple divisions 522, 524, 526. The divisions are displayed as distinct colors (e.g., the first division 522 being green, the second division 524 being orange, and the third division 526 being red). In alternate embodiments, the divisions can be demarked by shading with a light, medium, dark shading. Further, in alternate examples more than three divisions can be included in a similar manner.

Also included in the human machine interface 530 of FIG. 6 are distance lines 504. The distance lines 504 are static lines superimposed over the image, with each line 504 corresponding to a specific calibrated distance from the rear of the trailer 210. The calibration lines 504 overlap the divisions in the range indicator 520 and define each of the separate regions 522, 524, 526 of the range indicator 520.

The calibration of the distance lines 504 are determined via a calibration process using the proximity and sensing system defined above. To calibrate the distance lines 504, a vehicle operator maneuvers the vehicle until the vehicle is a predefined distance (e.g., 40 m) away from a detected object that has a 90 degree angle with the ground, as indicated by the numerical indicator 510. Once within the pre-defined distance, the vehicle operator manually sets the corresponding distance line 504. The calibration line can be manually set using a dial, directional arrow buttons, or any other conventional input to manually shift the horizontal distance line 504 up or down until the distance line is positioned at the base of the object. The vehicle operator then reverses the vehicle toward the object until the next pre-defined distance is reached, and repeats the calibration process for each pre-defined distance.

In some examples, the distance lines 504 can be maintained as part of the human machine interface described herein. In alternative examples, the distance lines 504 can be generated by, or governed by a distinct vision system and the human machine interface system is used to perform the calibration of the distance lines 504.

With continued reference to FIGS. 1-4, FIG. 5 schematically illustrates an example process 300 performed by the controller 26, by which the image 200 including the human machine interface 230 is created. While described within the context of a mirror replacement system, it is appreciated that the process can be utilized with any vehicle system including images that supplement mirrors instead of replacing the mirrors, or views independent of any mirror system.

Initially the controller 26 receives the video feed from one or more cameras 22, 24 and generates images for a display video feed in a generate image step 310. In examples where multiple images are stitched together, the stitching is performed by the controller 26 according to any known stitching or combination process.

Once generated, an object detection process is performed on the generated image 200, and any objects 220 within the image 200 are identified in an "Identify Object(s) in Image" step 320. While illustrated in the examples as a single object, one of skill in the art will appreciate that multiple objects can be identified by the controller 26 within a single image.

Once the object(s) have been identified, the controller 26 determines a distance between the object 220 and the vehicle component 210 in the "Determine Distance" step 330. In systems using image based analysis or partially image based analysis, in addition to identifying the presence of the object(s), the ECU determines an edge 214 of the vehicle component 210 and determines the distance from the edge 214 of the vehicle component 210 to the object 220. In systems using a radar, LIDAR, infrared, or ultrasonic sensor, the distance is determined via the sensor and the distance data is provided to the controller 26. In one particular example, a combination of a long range radar sensor and a short range ultrasonic sensor is utilized. In this example, the long range radar sensor provides an accuracy on the scale of feet (0.3 meters), while the ultrasonic sensor provides a close range accuracy on the scale of inches (25.4 millimeters). During operation, the long range radar sensor is utilized until the detected object is within range of the ultrasonic sensor is within range of the object and the system switches to the reading of the ultrasonic radar system.

Once the distance has been determined, the image is modified by overlaying a human machine interface 230 on top of the image to create a new image in a "Modify Image" step 340. The human machine interface includes specific information identifying the distance between the vehicle component 210 and the object 220. The specific distance can be communicated by any combination of color gradient, bar graphs, line distance and numerical indicators. By way of example, the specific information is communicated in one example using a numerical countdown display, with the countdown indicating the distance between the vehicle component 210 and the object. In another example, the specific information is communicated using a colored overlay, with each color indicating a specific distance (e.g. green indicating 5 meters, yellow indicating 3 meters, and red indicating 1 meter). In yet another example, the specific information is communicated using an expanding/shrinking geometric shaped shading area, with the size of the geometric shape on the screen directly corresponding to the distance. In yet further examples, any other system for communicating the specific distance can be utilized alongside these examples, or independent of these examples. The modified image is then displayed to the vehicle operator in a "Display Modified Image" step 350.

With reference to all of FIGS. 1-5, it is appreciated that in some examples continuous operation of the human machine interface may not be desirable. In such a case the controller 26 is configured to omit the overlay of the human machine interface until a triggering condition is met. In some examples, the triggering condition can be the activation of one or more driver assistance system built into the controller 26. In other examples, the triggering condition can be detection of an object within a predetermined distance of the vehicle. In one example the predetermined distance is 30 meters. In yet another example, the triggering condition can be a combination of the vehicle entering a driver assistance mode and detecting an object within the predetermined distance.

The system described above, and illustrated in FIGS. 1-6 provides a human machine interface integrated directly into the image being provided to the vehicle operator and includes specific identification of the distance between the vehicle and the detected object(s), thereby providing the operator with a more reliable and more accurate assistance in maneuvers involving or navigating past objects that are not directly in the field of view of the driver. Further, in systems where the human machine interface is directly integrated into the mirror replacement system, the information is presented to the driver in a single location as a single image thereby increasing clarity and ease of use.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for operating a vehicle camera system comprising:
   receiving a first image from at least one video camera;
   identifying a first object in the first image;
   determining a distance between a vehicle component and the identified object, wherein the vehicle component is an ego part capable of moving independently of the vehicle;
   modifying the first image by incorporating a human machine interface (HMI) within the first image, thereby creating a modified mirror-replacement image wherein the human machine interface includes a display configured to communicate the distance between the object and the vehicle component; and
   displaying the modified image to a vehicle operator.

2. The method of claim 1, wherein determining the distance between the object and the vehicle component is at least partially based on an image analysis of the first image.

3. The method of claim 1, wherein determining the distance between the object and the vehicle component is at least partially based on at least one physical sensor reading.

4. The method of claim 3, wherein the at least one physical sensor reading includes at least one of a radar sensor reading, a LIDAR sensor reading, an infrared sensor reading, a time of flight sensor and an ultrasonic sensor reading.

5. The method of claim 3, wherein the at least one physical sensor reading includes a radar sensor reading and an ultrasonic reading.

6. The method of claim 1, wherein the steps of modifying the first image by incorporating the human machine interface (HMI) within the first image, thereby creating a modified mirror-replacement image, and displaying the modified mirror-replacement image to the vehicle operator are performed in response to the determined distance being below a predefined threshold distance.

7. The method of claim 6, wherein the threshold distance is approximately 30 meters.

8. The method of claim 6, wherein the threshold distance is an activation distance for at least one automated driver assistance feature.

9. The method of claim 5, wherein the radar sensor reading provides an accuracy on the scale of feet and the ultrasonic reading provides an accuracy on the scale of inches.

10. The method of claim 1, wherein the vehicle component part is a trailer.

11. The method of claim 1, wherein the human machine interface comprises at least one of a numerical indicator, a multi-color overlay, and a bar-graph.

12. The method of claim 11, wherein the human machine interface comprises a combination of at least two of the numerical indicator, the multi-color overlay, and the bar-graph.

13. The method of claim 11, wherein the human machine interface comprises an object indicator identifying the detected object in the displayed image.

14. The method of claim 1, wherein generating the first image comprises generating a mirror replacement image by combining a plurality of images originating from distinct vehicle cameras.

15. The method of claim 1, further comprising overlaying at least one distance line on top of the first image, wherein the at least one distance line is calibrated at a predefined distance using the distance displayed in the human machine interface.

16. A vehicle system comprising:
   at least one exterior facing camera;
   a controller including an input connected to an output of the at least one exterior facing camera;
   an interior facing display connected to the controller;
   wherein the controller includes a memory storing instructions configured to cause the controller to identify a first object in a first image received by the controller, determine a distance between a vehicle component and the identified object, wherein the vehicle component is an ego part capable of moving independently of the vehicle, modify the first image by incorporating a human machine interface (HMI) within the first image, and output the modified image to the display; and
   wherein the human machine interface includes a display configured to communicate the distance between the object and the vehicle component.

17. The vehicle system of claim 16, wherein the controller is connected to a proximity sensor, the proximity sensor being configured to determine a distance between the proximity sensor and a detected object.

18. The vehicle system of claim 17, wherein the proximity sensor includes at least one of at least one of a radar sensor, a LIDAR sensor, an infrared sensor, a time of flight sensor and an ultrasonic sensor.

19. The vehicle system of claim 18, wherein the proximity sensor includes a radar sensor and an ultrasonic sensor.

20. The vehicle system of claim 16, wherein the controller further includes an at least partially image based object detection module.

21. The vehicle system of claim 20, wherein the at least partially image based object detection module includes supplemental sensor based object detection.

* * * * *

UNITED STATES PATENT AND TRADEMARK OFFICE
CERTIFICATE OF CORRECTION

PATENT NO. : 11,667,250 B2
APPLICATION NO. : 17/342745
DATED : June 6, 2023
INVENTOR(S) : Germaine et al.

It is certified that error appears in the above-identified patent and that said Letters Patent is hereby corrected as shown below:

In the Claims

Claim 1, Column 7, Line 34, replace "a first object" with --an object--

Claim 10, Column 8, Lines 10-11, replace "vehicle component part" with --vehicle component--

Claim 13, Column 8, Line 21, replace "detected object" with --identified object--

Claim 16, Column 8, Lines 37-38, "a first object" with --an object--

Signed and Sealed this
Twenty-sixth Day of September, 2023

Katherine Kelly Vidal
*Director of the United States Patent and Trademark Office*